(12) United States Patent
Chirciu

(10) Patent No.: US 11,497,353 B2
(45) Date of Patent: Nov. 15, 2022

(54) METHOD AND APPARATUS TO GRIND A PRODUCT

(71) Applicant: GIRARDI S.R.L., Spinea (IT)

(72) Inventor: Adrian Stefan Chirciu, Meolo (IT)

(73) Assignee: GIRARDI S.R.L., Spinea (IT)

( * ) Notice: Subject to any disclaimer, the term of this patent is extended or adjusted under 35 U.S.C. 154(b) by 102 days.

(21) Appl. No.: 16/616,710

(22) PCT Filed: May 24, 2018

(86) PCT No.: PCT/IT2018/050091
§ 371 (c)(1),
(2) Date: Nov. 25, 2019

(87) PCT Pub. No.: WO2018/216043
PCT Pub. Date: Nov. 29, 2018

(65) Prior Publication Data
US 2021/0145215 A1 May 20, 2021

(30) Foreign Application Priority Data

May 24, 2017 (IT) .......................... 102017000056465

(51) Int. Cl.
*A47J 42/44* (2006.01)
*A47J 42/06* (2006.01)

(52) U.S. Cl.
CPC .............. *A47J 42/44* (2013.01); *A47J 42/06* (2013.01)

(58) Field of Classification Search
CPC . A47J 42/44; A47J 42/06; A47J 42/50; B02C 25/00
See application file for complete search history.

(56) References Cited

U.S. PATENT DOCUMENTS

| 5,462,236 A | * | 10/1995 | Knepler | ................. | A47J 42/38 |
| | | | | | 241/34 |
| 2016/0345778 A1 | * | 12/2016 | Oddera | ................. | A47J 42/18 |
| 2017/0127884 A1 | * | 5/2017 | Oddera | ................. | A47J 31/42 |
| 2017/0367537 A1 | * | 12/2017 | Illy | ........................ | A47J 42/50 |
| 2018/0153332 A1 | * | 6/2018 | Abbiati | ............... | A47J 31/0663 |
| 2018/0153349 A1 | * | 6/2018 | Abbiati | ................ | A47J 31/404 |

FOREIGN PATENT DOCUMENTS

| EP | 3097831 A1 | 11/2016 |
| WO | 2012138327 A1 | 10/2012 |

OTHER PUBLICATIONS

International Search Report and Written Opinion from PCT/IT2018/050091 dated 9/055/2018 (10 pages).

* cited by examiner

*Primary Examiner* — Adam J Eiseman
*Assistant Examiner* — Mohammed S. Alawadi
(74) *Attorney, Agent, or Firm* — Calfee, Halter & Griswold

(57) ABSTRACT

A method and an apparatus are described to grind a product, for example a product in grain form, which provide to compare a value of estimated weight (pk*) with a predefined quantity (pTARGET) that has to be delivered in a delivery cycle, and that has been set by the user. The value of estimated weight (pk*) is calculated by adding a weight (pk) detected at successive instants (tk) of the delivery cycle with a suitable correction factor (C).

7 Claims, 4 Drawing Sheets

METHOD AND APPARATUS TO GRIND A PRODUCT

CROSS-REFERENCE TO RELATED APPLICATIONS

This application is a 371 of PCT Application No. PCT/IT2018/050091 filed on May 24, 2018, which claims priority to Italian Application No. 102017000056465 filed on May 24, 2017, the contents of which are hereby incorporated by reference as if recited in their entirety.

FIELD OF THE INVENTION

The present invention concerns a method and an apparatus to grind a product so as to obtain a ground product in powdered form. In particular, the method and the apparatus according to the invention can be configured to grind a product in grains, such as for example coffee.

BACKGROUND OF THE INVENTION

In the state of the art, apparatuses and methods are known for grinding different types of solid products in the form of grains or beans in order to obtain a product in powdered form.

In particular, for the purposes of the present invention, we will refer to coffee grinders which are well known in the art and which allow to grind the coffee beans to obtain the coffee powder necessary to prepare the beverage and at the same time allow to dose the quantity of powder that is delivered.

Known coffee grinders generally comprise a hopper which contains the product to be ground and which is provided with a removable upper lid, by means of which the operator can load the hopper from above with the coffee beans to be ground. The coffee beans then pass through a grinding device, driven by an electric motor, which grinds the product. The ground product thus obtained then reaches a pipe to deliver the coffee powder which takes it to the outside.

Known coffee grinders also comprise a support which projects toward the operator from a front wall of the coffee grinder. The support is configured to receive the filter holder of the coffee machine resting on it. During use, the operator rests the filter holder on the support, drives the coffee grinder, and waits for the coffee powder to be delivered above the filter holder.

Some known coffee grinders allow to control the quantity of powder delivered by regulating the delivery time of the ground product. For example, these coffee grinders require the user to introduce the desired value of the particle size of the coffee powder and the desired delivery time. These data are necessary because the delivery rate of the powder is a function of the particle size of the powder itself.

After the required delivery time has elapsed, it is provided that the electric motor is stopped in order to stop the grinding device.

One disadvantage of known coffee grinders is that they regulate the quantity of powder in an imprecise manner. In fact, since normally in each delivery cycle the coffee grinder delivers a few grams of powder in a delivery time of a few seconds, it is evident that even a few tenths of a second of advance or delay significantly affect the quantity of powder delivered. In particular, due to the inertia of the electric motor, that is, the time that elapses between the instant when the motor receives the stop command and the instant in which the grinding device actually stops, the actual delivery time—and hence the quantity of powder delivered—are generally always higher than those set.

Moreover, due to the non-uniform shape and size of the coffee beans, with the same time and particle size required, the quantity of grains entering the mills of the grinding device can be significantly different between one grinding cycle and the other.

Another disadvantage of known coffee grinders is that rough and approximate regulation can affect the taste of the beverage. It is in fact known that the quality of the beverage depends on many different factors, among which there are also the quantity and conditions of the coffee powder (such as humidity, volume, degree of compaction, etc.) that the water will pass through to extract the drink.

A coffee grinder of the type known in the art is described, for example, by the U.S. Pat. No. 5,462,236. According to the teachings of this document, the user sets the desired weight of ground coffee and the chosen particle size and the coffee grinder delivers the ground coffee for a pre-set time, which is a function of the data entered. In the coffee grinder described in this document it is possible to perform a calibration cycle, in which it is provided to detect the difference between the weight of the ground coffee that has actually been delivered by the device at the end of a delivery cycle and the weight of the ground coffee which has been set by the user. A correction factor is then calculated which is a function of the weight difference detected, for each weight that can be set by the user, and for each of the three particle sizes that can be selected. In this way, a table of correction factors, for each weight and for each particle size, is memorized in the coffee grinder described by U.S. Pat. No. 5,462,236, on the basis of which the delivery time is subsequently corrected, in accordance with a predetermined equation described in the patent text.

One disadvantage of the coffee grinder described by U.S. Pat. No. 5,462,236 is that it requires a long and laborious initial calibration step, which requires diligence, accuracy and precision from the user.

Another disadvantage of the coffee grinder described in this prior art document is that it is "rigid", that is, not flexible, since it is not able, in calculating the correction factor, to take into consideration other factors that can affect the delivery cycle.

Another disadvantage of the coffee grinder described by this prior art document is that it provides to evaluate any possible deviations of the actual weight from the expected weight only at the end of the delivery cycle, and not during the cycle as well. This coffee grinder does not therefore allow a "dynamic" correction in real time of the quantity of ground coffee that is being delivered.

Another coffee grinder of the known type is described in the international patent application no. WO-A1-2012/138327. This prior art document describes a coffee grinder which integrates a weighing apparatus for the ground coffee, in which it is provided to command the drive device that controls the quantity of coffee which is ground on the basis of the weight detected by the weighing apparatus.

One purpose of the present invention is to make available an improved grinding apparatus and method with respect to those known in the state of the art.

Another purpose of the present invention is to make available a grinding apparatus and method which allow to accurately and precisely regulate the quantity of product delivered.

Another purpose of the present invention is to make available a grinding apparatus and method able to autonomously correct the quantity of coffee delivered on the basis of the previous deliveries.

Another purpose of the present invention is to make available a grinding apparatus that is easy to use.

Another purpose is to make available a grinding method able to automatically regulate the quantity to be delivered.

Another purpose is to make available a grinding method which does not require long and laborious initial calibration operations.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, according to the invention a method is provided to grind a product, in particular a product in grain form, comprising the step of grinding a predefined quantity of the product by means of a grinding device that is driven by drive means, a step of delivering the ground product on a collection element, a step of commanding the drive means by means of a control and management unit so as to start and stop the grinding means to define a delivery cycle of the ground product having a length comprised between an initial instant and a final instant.

According to a characteristic aspect of the present invention, the method also provides to determine a quantity of ground product that is delivered between a determinate instant in which the drive means are commanded to stop the grinding device and a final instant in which the determinate instant is comprised between the initial instant and the final instant.

Moreover, the method according to the present invention is also characterized in that it provides to correct a respective instantaneous weight of the product delivered on the collection element which has been detected in correspondence with a plurality of subsequent respective instants comprised between the initial instant and the final instant, on the basis of a correction factor which is a function of the quantity of ground product.

In some embodiments, the step to determine the quantity of ground product delivered between the determinate instant in which the drive means are commanded to stop the grinding device and the final instant is implemented in a previous delivery cycle, while the step of correcting the instantaneous weight detected on the basis of said quantity is relative to a subsequent delivery cycle, in particular to the delivery cycle that follows said previous delivery cycle.

It should be noted that the correction of the instantaneous weight detected allows to obtain an estimated weight for each instant of the plurality of instants.

According to the invention, it is therefore provided to compare the estimated weight with the predefined quantity of the ground product, and when the result of the comparison is such that the estimated weight is greater than or equal to the predefined quantity, it provides to command the drive means to stop the grinding device.

In some embodiments, the method according to the invention comprises the step of setting the predefined quantity of the product that has to be ground in a delivery cycle, for example by means of a suitable user interface.

In some embodiments, the step of correcting the instantaneous weight detected, provides that the correction is carried out by adding a correction factor to the instantaneous weight detected.

In some embodiments, the correction factor coincides with the quantity of ground product that has been determined in the previous delivery cycle, that is, the quantity that has been delivered between the instant in which the drive means are commanded to stop the grinding device and the final instant of the cycle.

In some embodiments, the method according to the invention also comprises a step to process an error by subtracting the predefined quantity from the estimated weight. In these embodiments, the correction factor is obtained by adding this processed error to the quantity of ground product that has been determined in the previous delivery cycle.

According to the invention, an apparatus to grind a grain product, in particular coffee, is also provided, using the method described heretofore. An apparatus according to the invention comprises a user interface through which a user can introduce at least a predefined quantity of weight of ground product that has to be delivered in a delivery cycle, a containing element configured to contain the product to be ground, a grinding device to grind the product in grain form, drive means to drive the grinding device, and support means configured to support a collection element of the ground product that is independent from the apparatus and is able to interact with a machine for preparing a beverage. The support means comprise weighing means configured to detect a weight of a quantity of ground product delivered by the apparatus. The apparatus also comprises a control and management unit that is operatively connected to the weighing means and to the drive means to command the latter on the basis of the information received from the weighing means, being configured to implement the method to grind a product according to the present invention.

In some embodiments, the weighing means comprise a load cell.

Thanks to the method and apparatus according to the invention it is possible to accurately deliver the ground product in order to precisely obtain the quantity of desired product.

One advantage of the method and apparatus according to the invention is that they are able to automatically regulate the quantity of ground product which is delivered in each delivery cycle.

One advantage of the method and apparatus according to the present invention is that they are very precise and accurate thanks to the frequent detections of the weight at successive instants of the same delivery cycle, which allow a fine and precise control of the delivery cycle itself.

Another advantage of the method and apparatus according to the invention is that they implement a feedback control which allows to correct the weight of the ground product in the light of the quantity of product that has been delivered due to the inertia of the drive means in the previous delivery cycle. In this way it is possible to neutralize the unwanted effects caused by the inertia of the drive means because the method and apparatus according to the invention provide to stop the drive means (and consequently the grinding device) in a suitable instant which is anticipated compared to the end of the delivery cycle. This instant is obtained thanks to the feedback control, which allows to add to the weight detected in a certain instant, the weight of the product delivered in the terminal step of the delivery cycle due to the inertia of the drive means. This is the quantity that is delivered between the instant when the grinding device is stopped and the end of the delivery cycle.

Thanks to the method and apparatus according to the invention, there is also the further advantage that it is possible to deliver with great precision the weight of the ground product desired by the user because the error processed in the previous cycle is also taken into account. This error is a measure of the difference between the value of estimated weight and the desired quantity of weight at the end of the previous delivery cycle.

Advantageously, the method according to the present invention is a "self-learning" method since the correction factor and the error are values obtained as a function of detections performed during the immediately preceding delivery cycle and therefore are not fixed, but instead are substantially updated in real time on the basis of the actual functioning of the apparatus according to the present invention.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
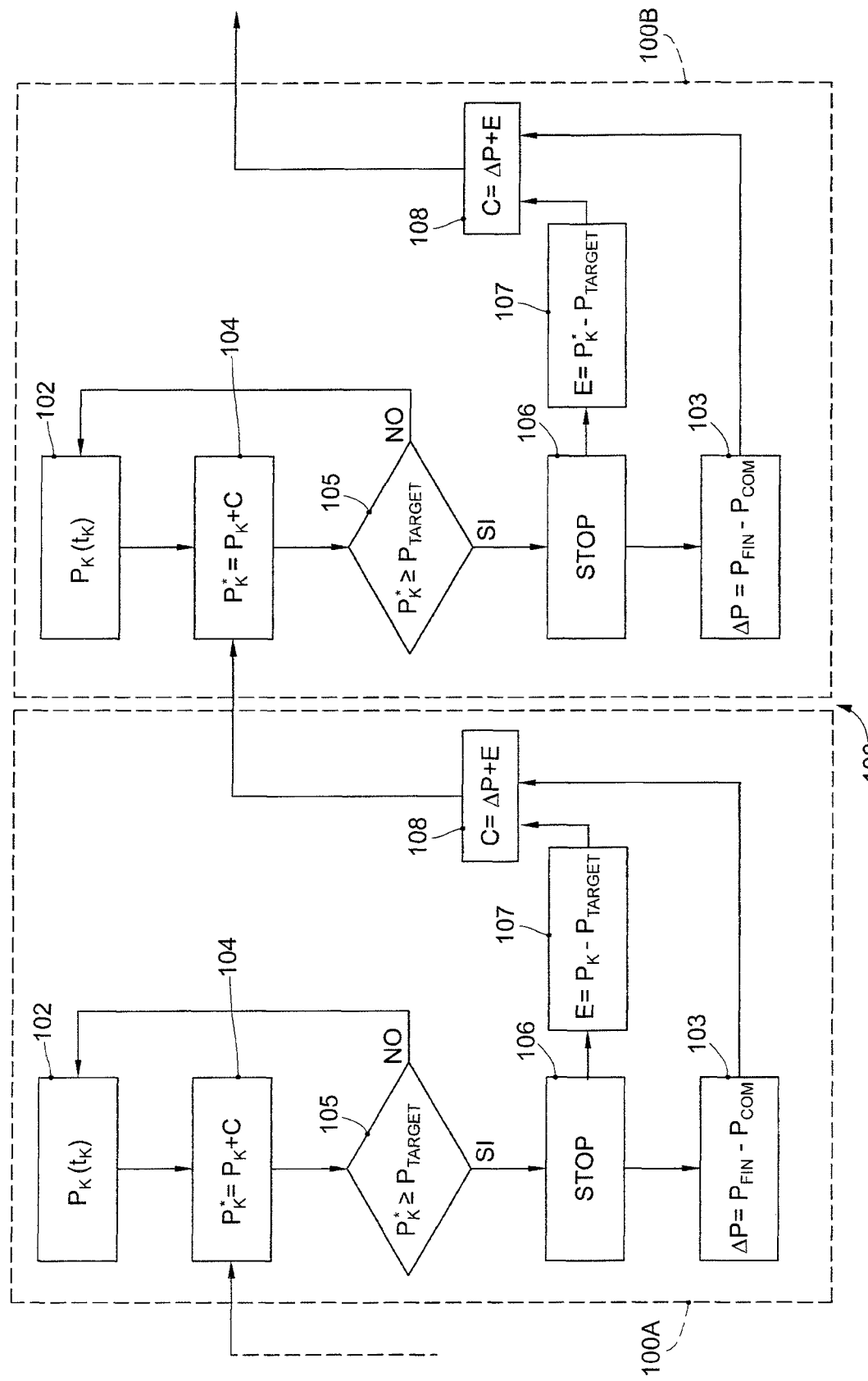
FIG. 1 is a diagram showing the method to grind a product according to the invention.

With reference to FIG. 1, we will now describe a method according to the invention to grind a product. In particular, the method according to the invention can be advantageously used to grind a product in grains, or in beans, such as for example coffee.

The drawing shows the steps relating to a plurality of delivery cycles 100, in which the steps relating to each delivery cycle are grouped together within a single broken line. By way of example, an n-th preceding delivery cycle 100A and an n+1-th subsequent delivery cycle 100B are visible.

Each delivery cycle 100A, 100B has a duration comprised between an initial instant $t_{START}$ and a final instant $t_{FIN}$.

These instants are the instants in which the ground product respectively begins and ends actually being delivered.

The method according to the invention comprises an initial step which provides to set a predefined quantity $p_{TARGET}$ of ground product which is desired to be obtained in a product delivery cycle 100. In particular, this step is implemented by a user who sets the desired value on a suitable user interface 13. The predefined quantity of ground product is delivered on a collection element 17.

Subsequently, the method provides to grind the product by means of a grinding device 11 which is driven by drive means 12. The grinding device 11 and the drive means 12, visible in FIG. 2, will be described in greater detail below in the context of the detailed description of an apparatus 10 to grind a product according to the invention.

The method to grind a product according to the invention also comprises a step 102 to detect at subsequent instants $t_k$ an instantaneous weight $p_k$ of the product delivered in correspondence with at least a plurality of instants k during a delivery cycle.

The method comprises a step 103 to determine a quantity of ground product $\Delta p$ which is delivered between an instant $t_{COM}$ in which the drive means 12 are commanded to stop the grinding device 11 and the final instant $t_{FIN}$. The instant $t_{COM}$ is an instant comprised between the initial instant $t_{START}$ and the final instant $t_{FIN}$. The quantity of ground product $\Delta p$ determined in step 103 is calculated as the difference between the weights $p_{FIN}$ and $p_{COM}$, that is, between the weight detected at the end of the delivery cycle (that is, at the instant $t_{FIN}$) and the weight detected in correspondence the instant $t_{COM}$.

It should be noted that the instant $t_{COM}$ is the instant in which the drive means 12 receive the stop command, that is, the moment when they are deactivated.

The method according to the invention also comprises a step 104 in which it is provided to correct a respective instantaneous weight $p_k$ of the product delivered on the collection element 17 which was detected in step 102 in correspondence with a plurality of respective instants $t_k$, on the basis of the quantity of ground product $\Delta p$.

In particular, in this step 104 the instantaneous weight $p_k$ is corrected on the basis of a correction factor C, which is a function of at least the quantity of ground product $\Delta p$ determined in step 103.

The correction of the instantaneous weight $p_k$ allows to calculate an estimated weight $p_k^*$ for each of the instants $t_k$, obtained by adding the correction factor C to the instantaneous weight $p_k$.

The method also provides step 105 to compare the estimated weight $p_k^*$ with the predefined quantity $p_{TARGET}$.

When the result of the comparison between the estimated weight $p_k^*$ and the predefined quantity $p_{TARGET}$ is such that the estimated value $p_k^*$ is greater than, or equal to, the predefined quantity $p_{TARGET}$, the method according to the invention provides the step 106 to command the drive means 12 so as to stop the grinding device 11, and terminate the delivery cycle.

On the contrary, when the result of the comparison between the estimated weight $p_k^*$ and the predefined quantity $p_{TARGET}$ is such that the estimated value $p_k^*$ is lower than the predefined quantity $p_{TARGET}$, then it is provided to continue the delivery of the ground product. During delivery, it is provided to continue to detect the weight $p_k$ (step 102) at one or more successive instants k.

The method according to the invention also comprises a step 107 to process an error E by subtracting the predefined quantity $p_{TARGET}$ from the estimated weight $p_k^*$. In particular, the error E is not calculated for each instant k, but only once for each delivery cycle 100A, 100B. In fact, the calculation of the error E is performed with the value of estimated weight $p_k^*$ such as to activate step 106, that is the first value of estimated weight $p_k^*$ which is greater than or equal to the predefined quantity $p_{TARGET}$.

The method according to the invention then provides a step 108, which provides to calculate the correction factor C by adding together the difference $\Delta p$ and the error E.

In some embodiments, the step 103 to determine a quantity of ground product $\Delta p$ in the manner explained above and step 107 to process an error E are related to a previous delivery cycle 100A, and these data are used to calculate the correction factor C (step 108) and then implement step 104, that is, to correct the respective instant weights $p_k$, of a successive delivery cycle 100B.

It should be noted that the difference $\Delta p$ and error E are constant and characteristic values for each delivery cycle which remain unchanged at all instants $t_k$ of the same delivery cycle, and which are obtained as described above, on the basis of the data detected in an immediately preceding delivery cycle.

In some versions of the method according to the invention, the quantity $\Delta p$ and error E can remain memorized even when the apparatus 10 is switched off. In this case, in the first delivery cycle 100B of a new working day, the apparatus 10 uses the value of the quantity $\Delta p$ and the error E calculated during the last delivery cycle 100A of the previous day.

In some versions, the method according to the invention provides to memorize the predefined quantity $p_{TARGET}$ of weight of ground product set by the user for a plurality of delivery cycles. For example, it can be provided that the predefined quantity $p_{TARGET}$ is kept memorized until the user sets a new and different value of predefined quantity $p_{TARGET}$, without the need for the user to set the predefined quantity $p_{TARGET}$ before each delivery cycle The apparatus 10 to grind a product, in particular a product in grains or in beans such as coffee for example, is able to implement the method to grind a product described above.

Figure 2:
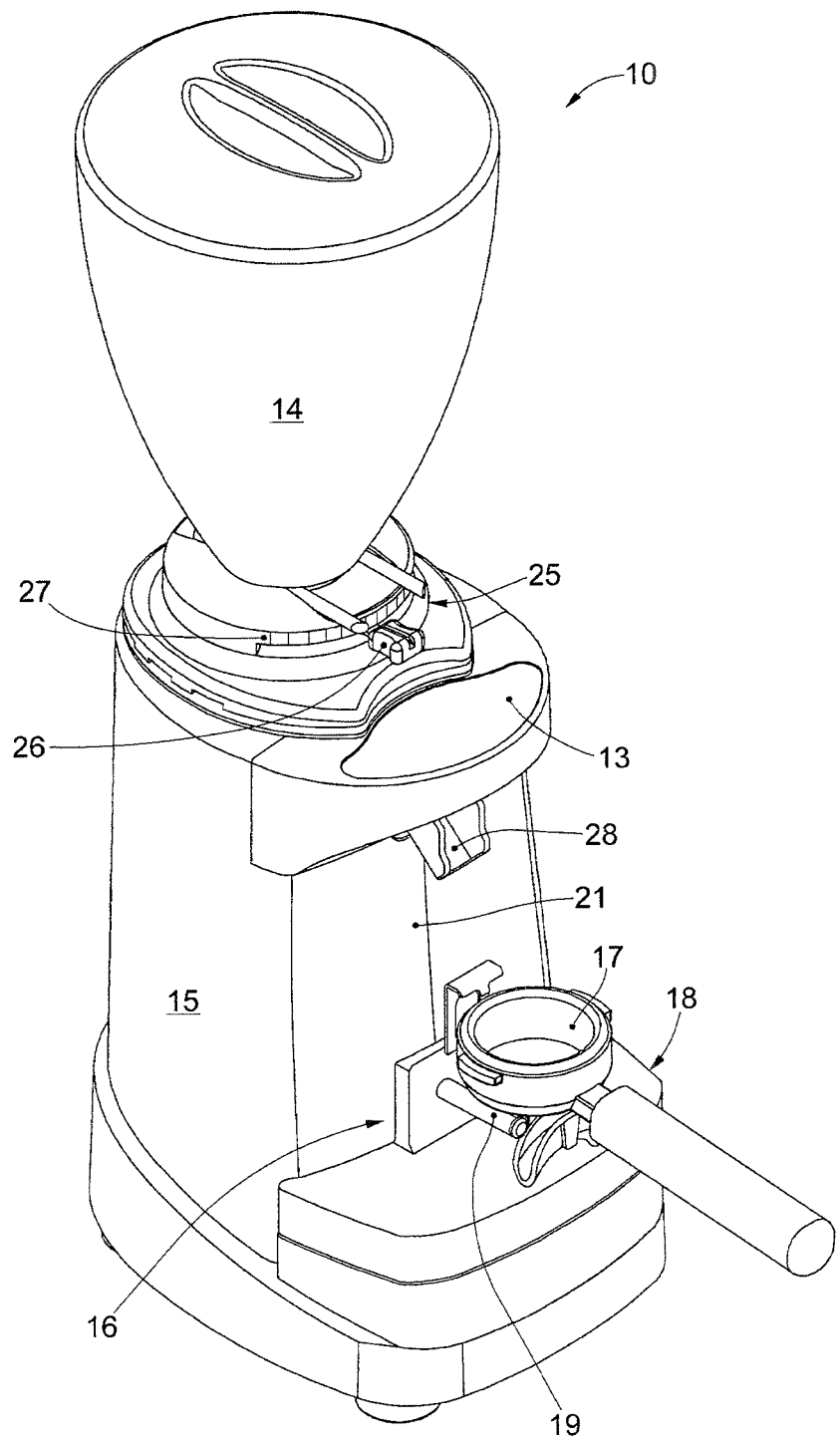
FIG. 2 is a perspective view of an apparatus to grind a product according to the invention.
Figure 3:
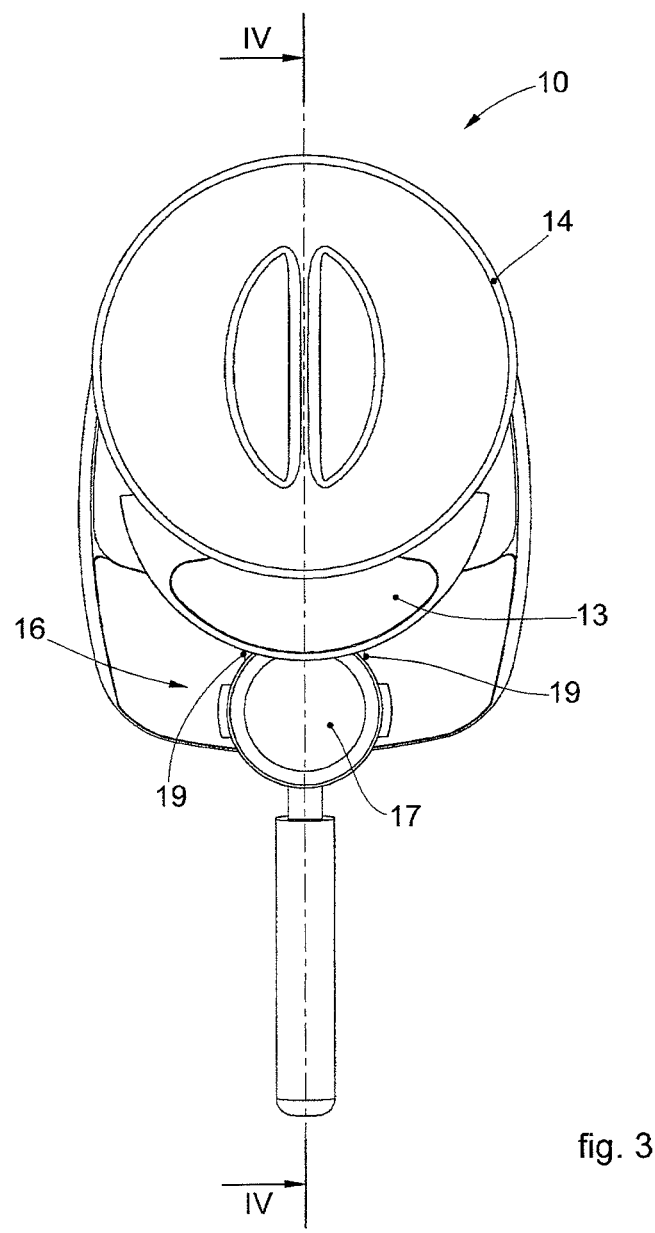
FIG. 3 is a plan view from above of the apparatus in FIG. 2.
Figure 4:
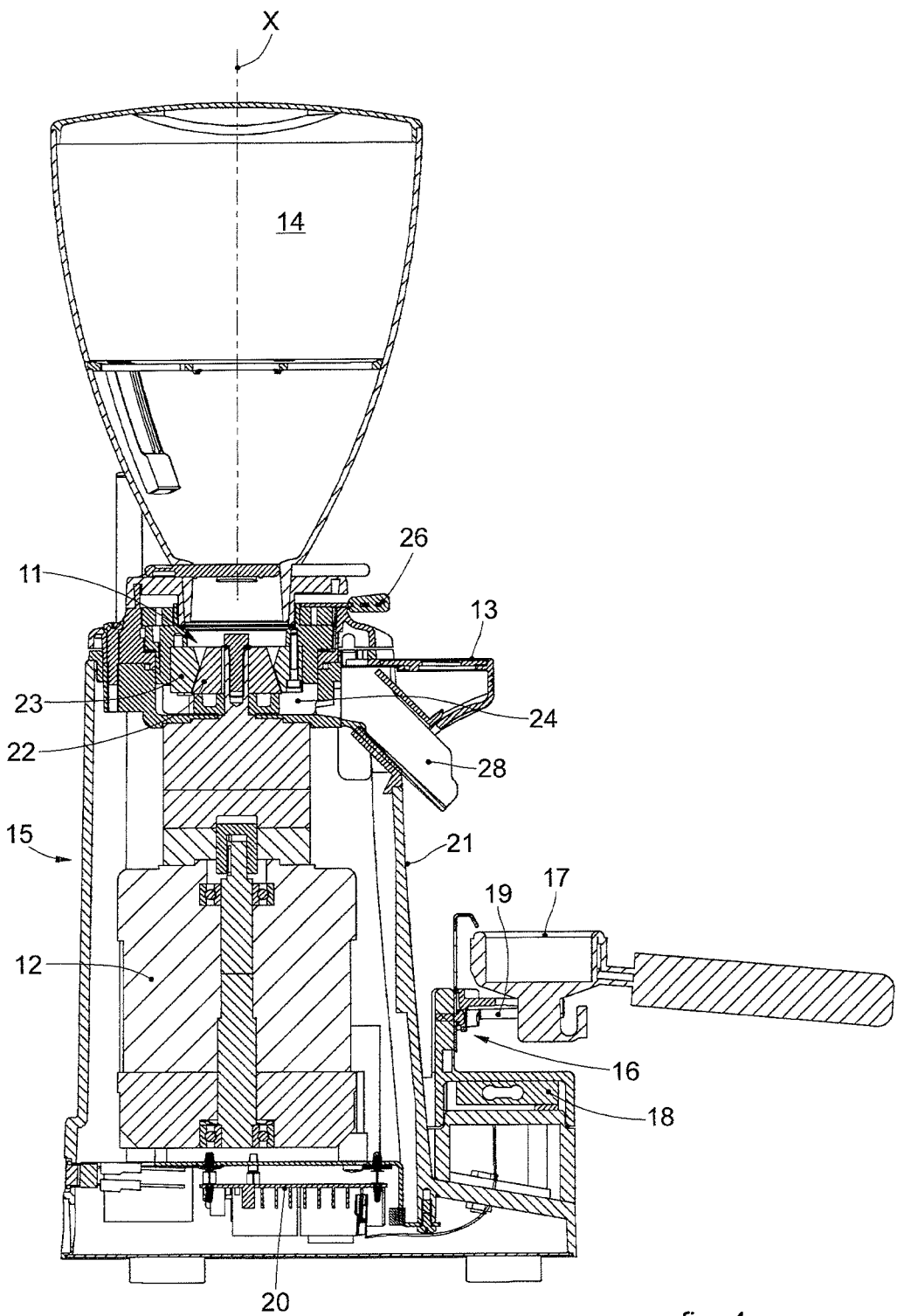
FIG. 4 is a cross section of the apparatus in FIG. 2 taken according to the section plane IV-IV visible in FIG. 3.

The apparatus 10 according to the invention, visible in FIGS. 2-4, comprises a user interface 13 which allows a user to introduce at least the predefined quantity $p_{TARGET}$ of weight of ground product that is to be delivered in a delivery cycle 100.

In some embodiments, the user interface can be a digital interface known in the state of the art.

The apparatus 10 also comprises a containing element 14 configured to contain the product to be ground, in particular in the form of grains.

The apparatus 10 comprises a grinding device 11 to grind the product and drive means 12 to drive the grinding device 11.

In some embodiments, the grinding device 11 generally comprises a first crushing element 22 and a second crushing element 23 which interact with each other to crush the coffee beans. The two crushing elements 22, 23 can be, for example, a pair of mills (conical or flat) rotating with relative motion to each other.

In some embodiments, one mill can be rotatable while the other can be stationary.

Each crushing element 22, 23 is provided with a plurality of teeth (not shown) distributed on it and protruding toward the other element. The cooperation of the teeth of the two crushing elements 22, 23 allows to grind the coffee beans.

As is known, the particle size of the ground product is a function of the distance between the crushing elements 22, 23, measured in the axial direction, that is, along a longitudinal axis X. The apparatus 10 therefore comprises a regulation device 25 by means of which a user can set the particle size of the ground product that he wants to obtain.

In some embodiments, the regulation device 25 can comprise a lever 26, the angular position of which can be modified by the user to modify the axial distance between the crushing elements 22, 23. The lever 26 projects frontally from the apparatus 10 in correspondence with a regulation scale 27 on which a numerical sequence is shown, indicative of the particle size of the ground product. In this way, the user can position the lever 26 on the regulation scale 27 exactly in correspondence with the value of the particle size desired. In this way, the crushing elements 22, 23 are disposed with respect to each other at an axial distance which allows to obtain the set particle size value.

During use, the grains fall due to gravity from the containing element 14 toward the grinding device 11, and then enter, after the product has been ground, into a chamber 24 located under the crushing elements 22, 23. From the chamber 24, the ground product then passes into an outlet channel 28 which takes it outside the apparatus 10. The outlet channel 28 can be inclined in such a manner as to direct the ground product toward the collection element 17.

In some embodiments, the drive means 12 comprise an electric motor, known in the art, which is housed inside a main body 15 of the apparatus 10 and is operatively connected to the grinding device 11. In particular, in the embodiment shown, the electric motor is connected to the first crushing element 22.

The apparatus 10 comprises support means 16 configured to support a collection element 17 of the ground product that is independent of the apparatus 10 and is able to interact with a machine for preparing a beverage. The collection element 17 of the ground product can, for example, be a filter-holder element of a known type.

In some embodiments, the support means 16 comprise at least one protruding element 19 which is intended to support the collection element 17.

In the embodiment shown, the support means 16 comprise a pair of protruding elements 19 which project toward the user from a front wall 21 of the main body 15.

The support means 16 comprise weighing means 18 configured to detect a weight of a quantity of ground product delivered by the apparatus 10. It should be noted that the weighing means 18 are configured to detect a net weight of the ground product present on the collection element 17, subtracting from the total weight detected the tare consisting of the weight of the collection element 17 itself.

It should be noted that, as far as ground coffee for espressos is concerned, the apparatus 10 is able to deliver a quantity of coffee provided to prepare a single beverage, or two beverages at the same time, depending on the filter-holder element 17 (single or double) used. It is obvious that, depending on the case, the user sets a desired quantity $p_{TARGET}$ on the interface 13 which is naturally different depending on the collection element 17 used, that is, whether it is a single filter cup (with only one outlet spout to deliver only one espresso coffee) or double (with two outlet spouts to deliver two espresso coffees simultaneously). In some embodiments, the weighing means 18 comprise a load cell of a known type.

It should be noted that the frequency of the weighing, that is, the cadence of the instants k in correspondence with which the values of instantaneous weight $p_k$ are to be detected, is a function of the weighing means 18, since it is an intrinsic datum of the latter.

The apparatus 10 also comprises a control and management unit 20 which is operatively connected to the weighing means 18 and to the drive means 12 in order to command the latter on the basis of the information received from the weighing means 18.

In some embodiments, the control and management unit 20 is configured as an electronic board comprising a plurality of printed circuits.

In some embodiments, the control and management unit 20 is received in the main body 15, below the drive means 12.

It is obvious that the control and management unit 20 is suitably programmed to implement the method according to the invention described above.

It is clear that modifications and/or additions of parts or steps can be made to the method and/or apparatus as described heretofore, without departing from the field and scope of the present invention.

It is also clear that, although the present invention has been described with reference to some specific examples, a person of skill in the art shall certainly be able to achieve many other equivalent forms of apparatuses and methods, having the characteristics as set forth in the claims and hence all coming within the field of protection defined thereby.

The invention claimed is:

1. A method to grind a product in grain form by a grinding device within each delivery cycle, wherein said grinding device is driven by drive means, said drive means is commanded by a control and management unit so as to start and stop said grinding device, wherein said method comprises:
    starting a first delivery cycle, by setting a predefined quantity ($p_{TARGET}$) of said ground product for said first delivery cycle and defining an initial instant ($t_{START}$);
    grinding said product and delivering said ground product on a collection element;
    continuously detecting an instantaneous weight ($P_k(t_k)$) of said ground product on said collection element until an estimated weight ($p_k^*$) is greater than or equal to said predefined quantity ($p_{TARGET}$), wherein said estimated weight ($p_k^*$) is a sum of a correction factor (C) and said instantaneous weight ($P_k(t_k)$)
    commanding said drive means to stop said grinding device and defining an instant ($t_{COM}$);
    consequently delivering said ground product on the collection element until said grinding device actually stops and defines a final instant ($t_{FIN}$);
    determining a quantity difference of said ground product ($\Delta p$) that is delivered between said instant ($t_{COM}$) and said final instant ($t_{FIN}$); and
    updating said correction factor (C) used for a second delivery cycle based on said quantity difference ($\Delta p$) in the first delivery cycle;
    wherein said quantity difference ($\Delta p$) is a constant and characteristic value for each delivery cycle.

2. The method according to claim 1, wherein the updating said correction factor (C) used for the second delivery cycle based on said quantity difference ($\Delta p$) in the first delivery cycle comprises:
    processing an error (E) by subtracting said predefined quantity ($p_{TARGET}$) from said estimated weight ($p_k^*$); and
    updating said correction factor (C) used for the second delivery cycle based on said quantity difference ($\Delta p$) and said error (E) in the first delivery cycle.

3. The method according to claim 2, further comprising:
    storing said error (E) calculated during a last delivery cycle of a first working day when said grinding device is switched off; and
    using said error (E) calculated during the last delivery cycle of the first working day in a first delivery cycle of a second working day.

4. The method according to claim 1, further comprising setting the predefined quantity ($p_{TARGET}$) through a user interface.

5. The method according to claim 1, further comprising:
    storing said quantity difference ($\Delta p$) calculated during a last delivery cycle of a first working day even when said grinding device is switched off; and
    using said quantity difference ($\Delta p$) calculated during the last delivery cycle of the first working day in a first delivery cycle of a second working day.

6. The method according to claim 1, wherein the first delivery cycle immediately precedes the second delivery cycle.

7. The method according to claim 1, further comprising:
    starting the second delivery cycle, by defining an initial instant ($t_{START}$) for said second delivery cycle;
    grinding said product and delivering said ground product on a collection element;
    continuously detecting a second instantaneous weight ($P_k(t_k)$) of said ground product on said collection element until a second estimated weight ($p_k^*$) is greater than or equal to said predefined quantity ($p_{TARGET}$), wherein said second estimated weight ($p_k^*$) is a sum of the updated correction factor (C) and said second instantaneous weight ($P_k(t_k)$) commanding said drive means to stop said grinding device and defining a second instant ($t_{COM}$);
    consequently delivering said ground product on the collection element until said grinding device actually stops and defines a second final instant ($t_{FIN}$);
    determining a quantity difference of said ground product ($\Delta p$) for the second delivery cycle that is delivered between said second instant ($t_{COM}$) and said second final instant ($t_{FIN}$); and
    updating said correction factor (C) used for a third delivery cycle based on said quantity difference ($\Delta p$) in the second delivery cycle;
    wherein said updated correction factor (C) used for the third delivery cycle differs from the updated correction factor (C) used for the second delivery cycle.

* * * * *